United States Patent [19]
Wernli et al.

[11] Patent Number: 5,974,127
[45] Date of Patent: Oct. 26, 1999

[54] METHOD AND SYSTEM FOR PLANNING A TELECOMMUNICATIONS NETWORK

[75] Inventors: Marc A. Wernli; Balan Nair, both of Highlands Ranch; Curtis A. Frankenfeld, Larkspur; Ted I. Mathis, Littleton; Mingda Jiang, Highlands Ranch, all of Colo.

[73] Assignees: US West, Inc., Denver; MediaOne Group, Inc., Englewood, both of Colo.

[21] Appl. No.: 08/964,485

[22] Filed: Nov. 5, 1997

[51] Int. Cl.[6] .............................. H04M 3/42; H04M 7/00; H04L 12/28; H04L 12/56
[52] U.S. Cl. .......................... 379/201; 379/220; 370/404
[58] Field of Search .................................... 379/201, 219, 379/220, 242, 265, 90.01, 221, 266, 309; 370/404, 406, 409

[56] References Cited

U.S. PATENT DOCUMENTS

5,067,148 11/1991 Sardana ..................................... 379/111
5,515,367 5/1996 Cox, Jr. et al. ......................... 370/404

Primary Examiner—Krista Zele
Assistant Examiner—David Huynh
Attorney, Agent, or Firm—Brooks & Kushman PC

[57] ABSTRACT

A method and system for planning a future telecommunications network from an existing telecommunications network interconnecting a plurality of users utilizes an input device for determining future demands for the future telecommunications network. A processor then determines future characteristics of a plurality of loops connecting each of the users to a central office based on the future demands. Future characteristics of a plurality of transports connecting each of the central offices is determined based on the future demands. The processor then determines future characteristics of switches disposed in each of the central offices based on the future characteristics of the plurality of loops and the plurality of transports. Future characteristics of common systems disposed within each of the central offices is determined based on the future characteristics of the switches. The future telecommunications network can then be planned based on the future characteristics of the plurality of loops, the plurality of transports, the switches, and the common systems.

19 Claims, 7 Drawing Sheets

METHOD AND SYSTEM FOR PLANNING A TELECOMMUNICATIONS NETWORK

TECHNICAL FIELD

The present invention relates to methods and systems for planning and engineering a telecommunications network.

BACKGROUND ART

Telecommunications networks consist of many cooperating subsystems. These subsystems include the components connecting customer equipment with a central office (CO), known as outside plant (OSP) or loop components, switching equipment within the CO, interoffice (IOF) connections and support, and common systems that support OSP, switch and IOF services use.

Customer services sold create a demand on the OSP portion of the network. The OSP demand defines requirements for switching and interoffice transport. All three technologies define the need for common systems. Traditionally, these four areas of the telecommunications network are planned independently, with the only joint planning involving individual planners defining common requirements for their individual efforts.

Capacity planning processes provided little capability for studying business strategies and longrange budget options. Currently, such studies are accomplished using different tools which provide different budget requirements and technical solutions than those identified based on day-to-day planning, leading to significant gaps between strategies developed at a high level and what is actually implemented. This, in turn, results in marketing services where the actual deployment of capacity and capability has not been done to meet envisioned demand. As the telecommunications market and technology becomes more complex with shorter time available to provide the services, market efforts and actual deployment need to become integrated and flexible.

Current network planning and engineering tools fail to integrate several critical requirements. First, the entire telecommunications network must be considered. Second, current and future capacity requirements must be incorporated. Third, inventories of installed and installable equipment must be maintained and used in planning considerations. Fourth, technology migration must be enabled. Finally, the tool must be flexible enough to adapt to changing business practices.

DISCLOSURE OF THE INVENTION

It is thus a general object of the present invention to provide a method and system for planning a telecommunications systems including outside plant, switching equipment, interoffice connections and common systems based on current and future demands, inventories, capacity, and business constraints.

In carrying out the above object and other objects, features, and advantages of the present invention, a method is provided for planning a telecommunications system. The method includes the step of determining a plurality of future demands for the future telecommunications network. The method also includes the step of determining future characteristics of a plurality of loops connecting users to one of a plurality of central offices based on the plurality of future demands. Still further, the method includes the step of determining future characteristics of a plurality of transports each of the central offices based on the plurality of future demands. The method further includes the step of determining future characteristics of switches disposed in each of the central offices based on the future characteristics of the plurality of loops and the plurality of transports. The method also includes the step of determining future characteristics of common systems disposed in each of the central offices based on the future characteristics of the switches. Finally, the method includes the step of determining the future telecommunications network based on the future characteristics of the plurality of loops, the plurality of transports, the switches, and the common systems.

In further carrying out the above object and other objects, features, and advantages of the present invention, a system is also provided for carrying out the steps of the above described method. The system includes means for determining a plurality of future demands for the telecommunications network. The system also includes a first processor for determining future characteristics of the plurality of loops based on the plurality of future demands, and a second processor for determining future characteristics of the plurality of transports based on the plurality of future demands. Still further, the system includes a third processor for determining future characteristics of the switches based on the future characteristics of the plurality of loops and the plurality of transports, and a fourth processor for determining future characteristics of the common systems based on the future characteristics of the switches. The system finally includes a fifth processor for determining the future telecommunications network based on the future characteristics of the plurality of loops, the plurality of transports, the switches, and the common systems.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
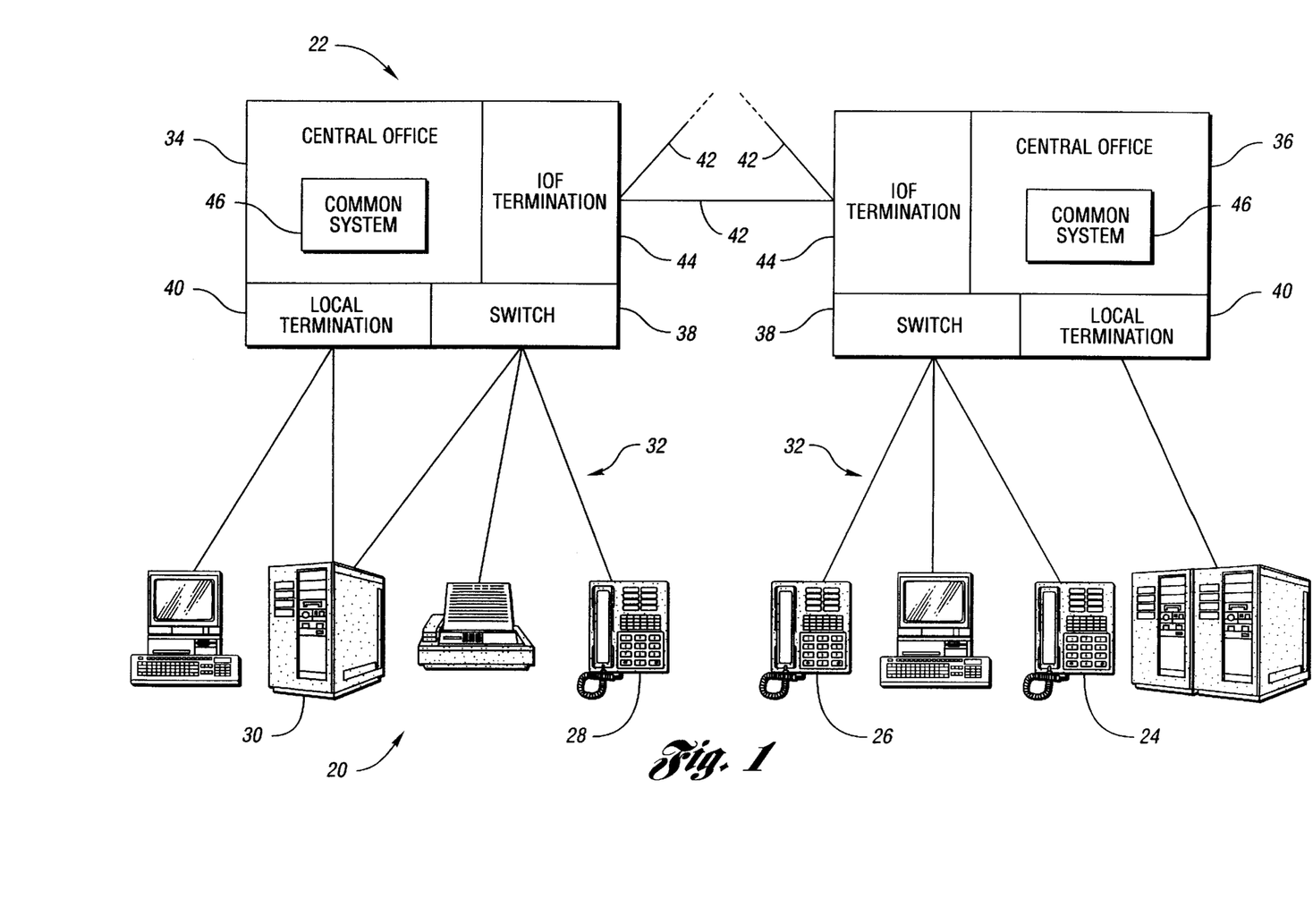
FIG. 1 is a graphical representation of a telecommunications network illustrating various technology components modeled by the present invention.

Referring now to FIG. 1, a block diagram of a general telecommunications network is shown. A plurality of customers, shown generally as 20, access a telecommunication network, shown generally as 22, through analog devices such as switched voice communications (common telephone service), represented by 24, 26, and 28, or digital devices such as bank automated tellers, credit card verification processors or higher bandwidth digital data services for corporate data systems or Internet providers, represented by 30. These customer devices are tied to OSP equipment, shown generally as 32. OSP portion 32 includes the copper or fiber cables and electrical components connecting customers 20 to a central office, two of which are shown as 34 and 36. The specific components of OSP 32 are dependent on the particular products supplied to the customer. These customer circuits are terminated in a central office on either a switch 38 or other common terminating electronic device 40.

Switch 38 routes a call per customer 24 dialing instructions. The call is routed back out on OSP 32 to customer 26 within central office 36 or is routed via interoffice transport or trunks 42 to another central office 34 to customer 28. Other non-switched customer services, such as 30, are connected via direct or electronically controlled means to another OSP customer or are routed via IOF transport 42 through IOF terminations 44 to another central office to complete the circuit. In each central office 34, 36 there are certain common systems 46 that OSP 32, switch 38, and IOF services 42, 44 use. Common systems 46 include providing power for all electronic devices, central office floor space, and electronic devices that monitor the overall health and performance of the total network.

The invention implements a programmable set of architectures, models and configurations (AMCs) The architecture represents rules and strategies used to determine how to augment the telephone network based on any given combination of input constraints. Rules are developed based on market priority, existing types and quantities of facilities, and types and quantities of services required. A model is a solution type determined by an analysis of rules contained in an architecture. Examples include various digital loop carrier systems and copper cable. Configurations are items or groups of items which are actually purchased and installed in the telephone network. Examples include cabinets, plug-in packages, and poles. Configurations can also describe activities such as placement, restoration, and rearrangement of equipment.

Referring now to FIGS. 2–6, flow diagrams illustrating operation of a system and method according to the present invention are shown. As will be appreciated by one of ordinary skill in the art, the operations illustrated are not necessarily sequential operations. Similarly, operations may be performed by software, hardware, or a combination of both. The present invention transcends any particular implementation and is shown in sequential flow chart form for ease of illustration.

Figure 2:
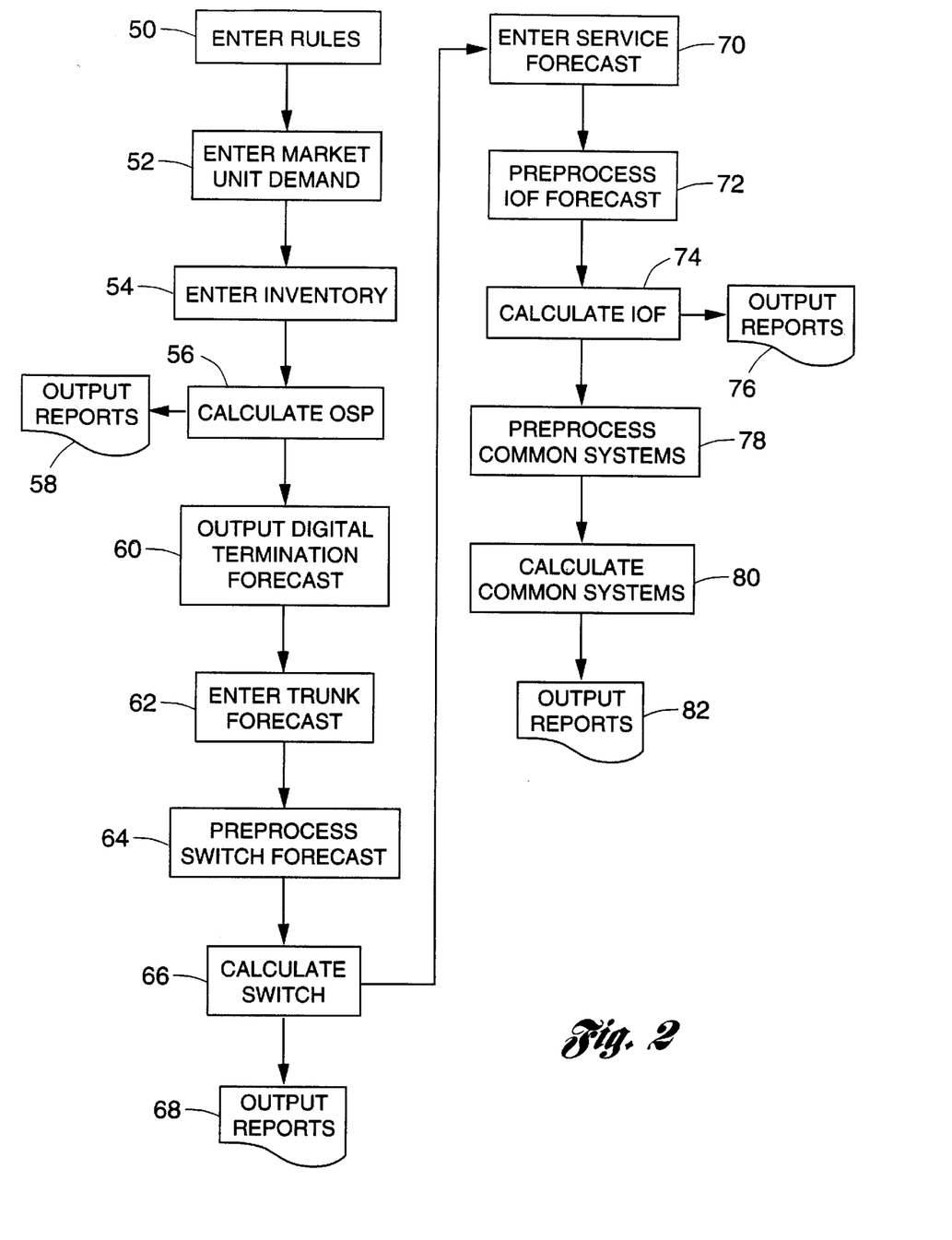
FIG. 2 is a flow diagram representing operation of a system or method for planning and engineering a telecommunication network according to the present invention.

FIG. 2 shows the integration of the four main technologies into the present invention. The OSP module will produce part of the demand for the switch and the common systems, the switch will drive demand for common systems and inter-office facilities will drive demand for both switch and common systems.

Rules are entered at 50 to help define the network architecture. Market unit demand is entered at 52 to estimate user requirements during the planning period. An inventory of current equipment is entered at 54 to provide a baseline for specifying additional equipment.

The OSP technology requirements are calculated at 56 for each period of interest based on rules, market unit demand, and inventory. Details on the OSP calculation are discussed in relation to FIG. 3 forthwith. Reports on the results of OSP calculations can be produced, as shown at block 58.

One product of the OSP calculation is the digital termination forecast, block 60. This forecast predicts how voice-grade service will be routed to a switch and whether that service will be implemented as analog or digital within the switch.

Trunk forecast data is entered at 62. The trunk forecast is an integration of the IOF facilities message trunk demand and the market unit services that terminate on the trunk side (e.g. DSS Advanced, DID). This data predicts capacity requirements for IOF transports.

The switch forecast is preprocessed at 64 using the digital termination forecast, market unit demand and the trunk forecast. The preprocessing produces switch demand estimations.

The switch technology requirements are calculated, block 66, for each period of interest based on rules, inventory, and the output of the switch forecast preprocessing. Details on the switch calculation are discussed in relation to FIG. 4 forthwith. Reports on the results of switch calculations can be produced, as shown at block 68.

The designed services forecast is entered at 70. This forecast predicts special services local to the CO, such as ISDN. This information is used to determine if additional message trunks are required or if lines can be rolled up to a DS-3 level.

The IOF forecast is preprocessed at 72 using the trunk forecast and the designed services forecast. The preprocessing produces demand estimates for IOF equipment.

The IOF technology requirements are calculated at 74 for each period of interest based on rules, IOF forecast, and inventory. Details on the IOF calculation are discussed in relation to FIG. 5 forthwith. Reports on the results of IOF calculations can be produced, as shown at block 76.

The common systems forecast is preprocessed at 78 using results from the OSP, switch and IOF calculations. The preprocessing produces demand estimates for common systems equipment.

The common systems technology requirements are calculated at 80 for each period of interest based on the common system forecast and inventory. Details on the common systems calculation are discussed in relation to FIG. 6 forthwith. Reports on the results of common systems calculations can be produced, as shown at block 82.

Figure 3:
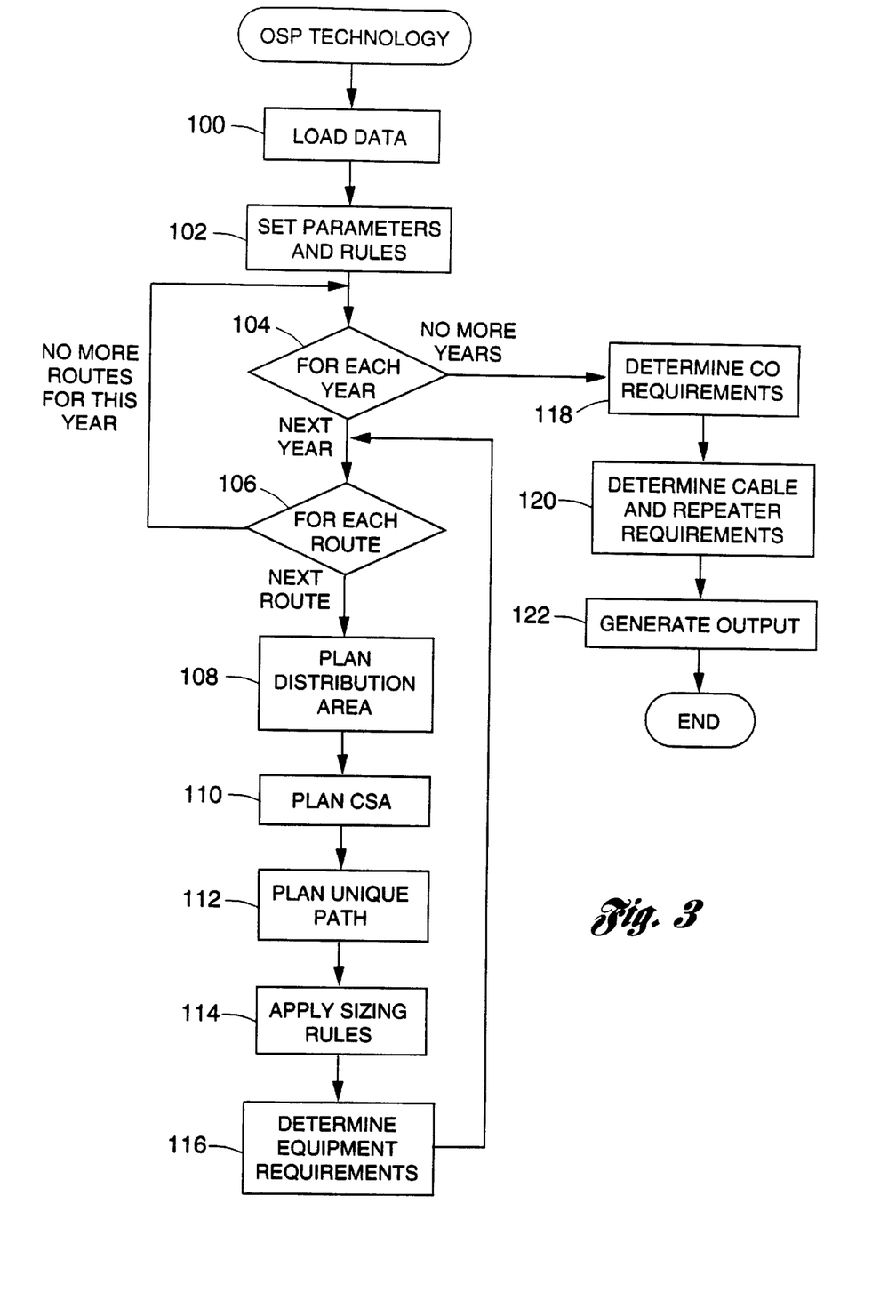
FIG. 3 is a flow diagram representing operation of a system or method for planning and engineering OSP technology according to the present invention.

Referring now to FIG. 3, a flow diagram illustrating operation of a system and method for implementing OSP technology calculations is shown. The OSP calculation simulates the growth and augmentation of a local loop for a local exchange service provisioning. By implementing standard AMCs, the OSP module expands the existing network based on a forecast of services. The services are grouped into demand categories which are tested against the embedded base network to determine if sufficient facilities exist to satisfy the current demand. If it is determined that shortages do exist, the present invention applies rules contained in the architectures to determine a solution appropriate for the input constraints. Once a model has been determined, other more detailed rules are applied which specify the particular configurations.

Data required for OSP calculations is loaded at 100. This data includes the inventory of existing technology and forecasted demands. In the current embodiment, the existing technology is obtained from legacy systems which inventory existing facilities and from provisioning systems which track utilization of those facilities. Marketing provides forecasting input about future demands for various services. It is appreciated that these functions could be incorporated into the present invention.

Planning parameters and rules, set at 102, are used to determine how t o resolve shortages. These planning parameters and rules are developed by a work group which determines the best possible solution to a specific network scenario given the constraints of economics, reliability, and service capability.

A looping process for planning a wire center is begun. This process loops through each period to be analyzed at 104 and through each route within each period at 106. The planning continues until all elements of the wire center have been completed. An annual time period is shown in FIG. 3, however any convenient time interval may be chosen for each loop.

Each distribution area (DA) in the route is initially considered at 108, be ginning with the DA most distant from the CO. The other DAs in the same carrier serving area (CSA) as the first DA are then planned. Even though each DA is considered on a stand-alone basis on the first pass, the initial solution may be overwritten if a better CSA or unique path solution is found as discussed forthwith.

Each CSA in the route is considered at 110. If the rule sets applied find a more suitable solution for the entire CSA, then the initial DA solution is discarded in favor of the CSA solution.

Each unique path is considered at 112. A unique path is the logical path from a CSA to a central office taking into account equipment placement and shortages. The purpose of defining a unique path is to determine if equipment increases in one CSA can relieve shortages in another CSA. A unique path is the logical path from a CSA to a central office taking into account equipment placement and shortages. The purpose of defining a unique path is to determine if equipment increases in one CSA can relieve shortages in another CSA. In similar fashion to the CSA solution, the unique path solution may potentially overwrite the original solution for a DA, depending on whether or not the rules succeed for each individual data scenario.

Sizing rules are applied, as shown at block 114. In the current embodiment, a lookup of each selected model is performed, and sizing details from matrices and tables which describe the capacities required for each model are implemented. It will be appreciated that other techniques may be used within the spirit and scope of this invention.

Detailed equipment requirements are determined at 166 for each route. These results are stored for later reporting.

Central office equipment requirements are planned, block 118, for a given wire center. Many items in the CO can be shared among multiple DAs and routes. For example, the central office terminal (COT) for many digital loop carrier (DLC) systems can be shared by multiple routes and DAs. The OSP calculation also accumulates and forwards these requirements to other modules.

The demand for cables and repeaters for many DAs and CSAs is determined at 120. These requirements are accumulated and compiled to generate feeder section requirements. Requirements include repeater housings and plug-ins as well as fiber and copper cables required to support the various models in a given route.

Output is generated at 122 for all of the detailed equipment requirements determined at blocks 116, 118 and 120. Outputs are prepared showing details of costs and configurations required for implementation in the wire center. These reports are grouped by DA, CSA, and CO, as well as a summary for the entire wire center. Data discrepancies are analyzed and written to error reports, and a detailed analysis of the planning decisions made are reported in a trace report.

Figure 4:
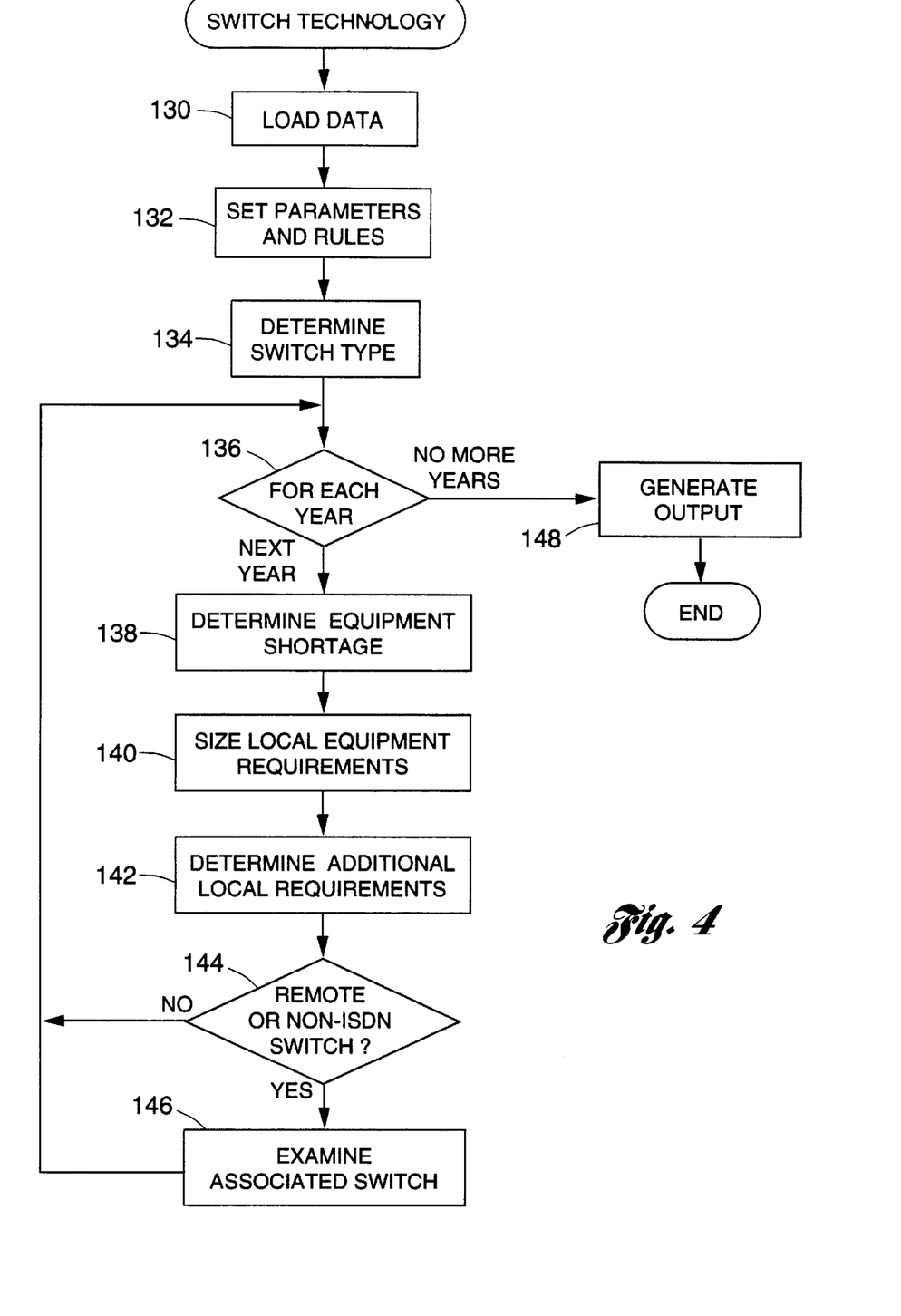
FIG. 4 is a flow diagram representing operation of a system or method for planning and engineering switch technology according to the present invention.

Referring now to FIG. 4, the flow diagram illustrating operation of a system and method for implementing switch technology calculations is shown. The switching technology component covers all common telephony switch types. The critical components of the switching process are to identify the specific service demands for all switches, the inventory for these switches, the rules guiding the growth of the switches and the specific strategies for each individual switch on job timing, traffic patterns, software, and additional hardware requirements. Each switch has many peripherals within it.

Data regarding the switch is loaded at 130. The switching technology calculation examines each switch individually using a switch identifier. The switch identifier is the primary key with which attributes on all peripheral inventories and associated demands are accessed. The switch demands are obtained from many sources, including service demands, such as ISDN Basic, ISDN Primary, DSS Advanced, DSS Basic, voice grade and DID are derived from market unit strategies; the integration termination requirements TR-008 and GR-303 are derived from OSP capacity analysis and planning process; and message trunking requirements are derived from the IOF facilities demands. Integration with OSP is critical to the appropriate sizing of the switch. The local loop determines the technology that transports the voice grade signal from the customer to the switch. These signals can terminate on the switch as an analog signal or a DS-1 signal. The DS-1 signals can carry voice grade and ISDN Basic. The OSP component will communicate the number of voice grade and ISDN Basic lines to the switching component with the DS-1 requirements. This information is integrated with the forecast from the market units.

Parameters and rules are set at block 132. In the current implementation, the rules on sizing and mapping of service demand and switch peripherals reside in a database and are updated by subject matter experts. These rules drive the proper growth jobs.

Each individual switch has specific rules associated with it such as, for example, triggers for growth jobs such as percentage administrative spare, fixed line spare, or traffic patterns that are unique for each individual switch. In the current embodiment, these switch-specific items are maintained by subject matter experts for the specific switch. Each individual switch will also have growth strategies for software and additional hardware growth strategies that will be stored in databases. These additional items will follow rules to determine appropriate application.

There are additional strategies that reside in the database such as the sizing cycle of peripherals. There are also rules to determine alternatives for growing a connecting switch under situations such as when a local switch cannot handle a specific demand like ISDN Basic or when a remote switch grows and requires additional equipment in the host switch.

The switch type is determined at 134 to determine the individual peripheral capacities and demands.

A looping process for planning the switch is begun. This process loops through each period to be planned, as shown at block 136. The planning continues until all elements of the switch have been completed. An annual time period is shown in FIG. 4, however any convenient time interval may be chosen for each loop.

Equipment shortages are determined at 138. The present invention utilizes data from blocks 130 and 132 to calculate shortage for all peripherals based on inventory and demand. Shortages are determined for the primary services such as analog voice grade, ISDN Basic, ISDN Primary, TR-008 and TR-303, DS-1 integration and trunks. From these shortages, further equipment shortages can be derived for common services such as frames, test units or intra-switch transport.

Local equipment requirements are sized at block 140. The shortages calculated in 138 are analyzed and, based on rule sets from 132, a solution is determined. The solution is then sized appropriately based on strategies such as, for example, 18 month solutions for line units. The solution process is established by a hierarchical process such as, for example, a switch that is short on both lines and trunks will have the line problem solved first because the trunk job may not be needed if the shortage is within a range determined by the line type.

Additional local equipment requirements are determined at 142. Once again these decisions are based on the rule sets read in from 132. These additional requirements cover details such as power cables and software enhancements.

If the switch is a remote switch or a non-ISDN switch with ISDN demand, conditional block 144, a set of rules is used to determine if an associated switch needs to be examined, as shown at block 146. For example, if the switch is a remote, a determination is made to see if additional umbilical trunks to the host switch are required. If so, the associated host switch is processed using steps similar to 138, 140 and 142.

Output is generated at 148 to produce a bill of materials that will be used by switch planners and by network modelers. This data is used to plan jobs and to do what-if scenarios where different rules or strategies are modified, resulting in requirements for different equipment. The switch module will produce demand requirements for common systems. The switch module will also produce numerous reports that identify peripherals that are close to full capacity.

Figure 5:
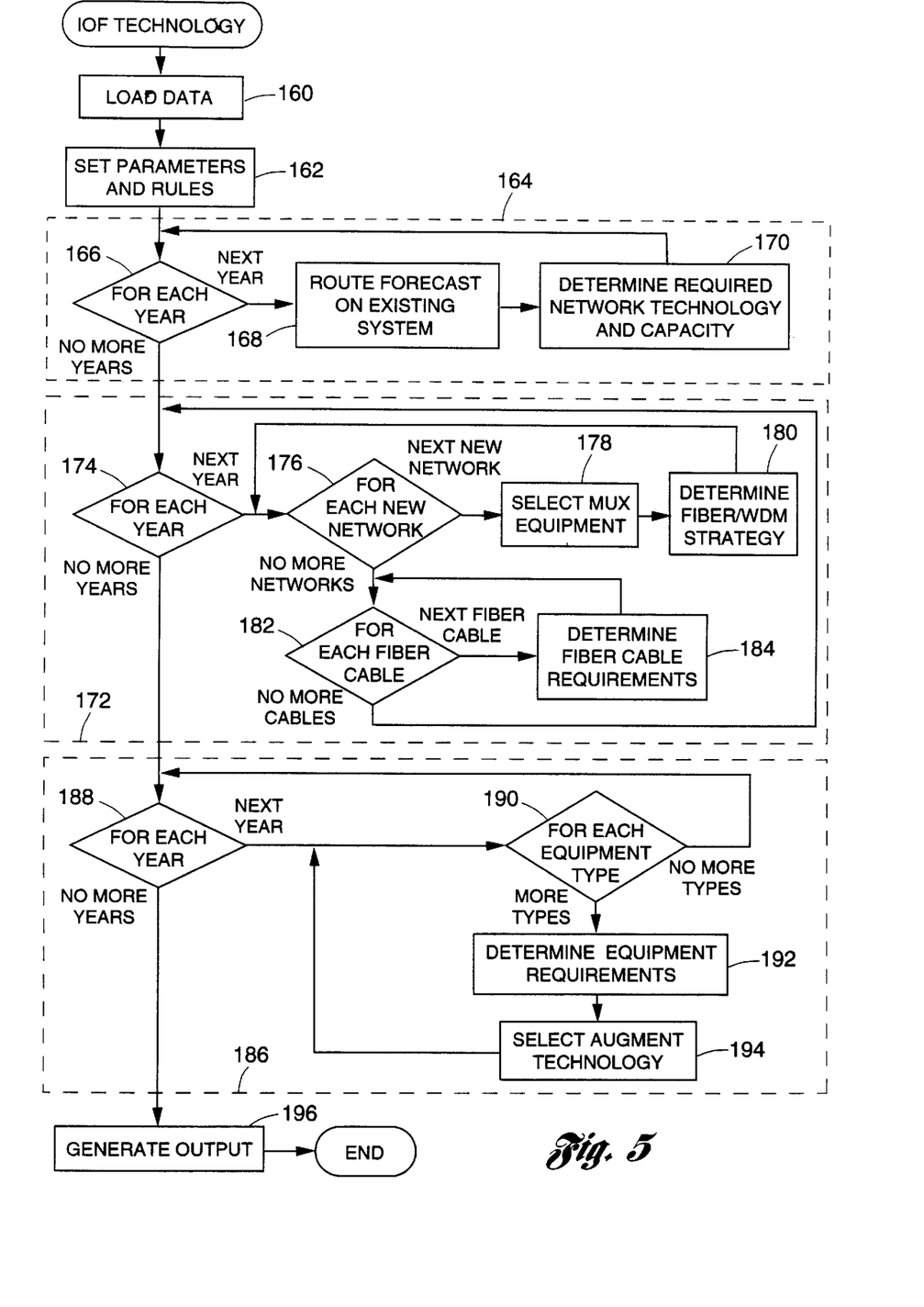
FIG. 5 is a flow diagram representing operation of a system or method for planning and engineering IOF technology according to the present technology.

Referring now to FIG. 5, the flow diagram illustrating operation of a system and method for implementing IOF technology calculations is shown. IOF technology calculations include planning for central office common terminating equipment and transport systems between central offices. The equipment and transport planning is generally independent. The two technologies are, however, related in that demand for transport contributes to the demand for terminating equipment. In the current embodiment, the forecast for equipment terminations and transport is developed by interoffice planners using TIRKS/FEPS, as is well-known in the art, which provides inventory, usage, and forecast for both terminating equipment and transport systems. However, it is appreciated that this functionality can be incorporated into the current invention.

Inventory and forecast data is loaded at 160. The present invention tracks many common terminating equipment categories, including digital channel banks, 1/3 multiplexers (M13), 3/3 Digital Cross Connects (3/3 DCS), 3/1 DCS, and 1/0 DCS. The number of DS3, DS1, and DS0 (as applicable) terminations available is maintained and forecast for each equipment category. Each DCS machine is inventoried separately at this same level of detail.

The present invention also tracks each interoffice transport system. The system technologies covered include T-1 spans (copper wire based interoffice transport), asynchronous fiber optic transport systems (async), and SONET fiber optic transport systems (OC-3, OC-12, OC-48, OC-192). Each of these systems is inventoried by its unique network identifier, the overall bandwidth available on the system, the portion currently assigned, and the forecast provided for that system. In addition, the DS3 planning forecast demand between central offices is maintained.

Data is extracted based on the scope specified for the current run. The scope can range from a single central office to an entire Local Access and Transport Area (LATA).

Parameters and rules are set at block 162. These rules define growth and technology migration strategies for all CO terminating equipment and IOF transports. These rules can be changed to allow analysis of technical options required for meeting network growth requirements.

Transport planning occurs, as shown generally at 164. The current embodiment uses an external software module called the SONET Planning Tool (SPT) to perform the initial planning and technology selection for interoffice transport. This tool is described in U.S. Pat. No. 5,515,367 to Cox et. al. assigned to the same assignee and incorporated herein by reference. Alternatively, another planning tool may be used or incorporated into the present invention to accommodate changes in transport technology and business strategies.

A looping process for transport planning is begun. This process loops through each period to be planned, as shown at block 166. An annual time period is shown, however any convenient time interval may be chosen for each loop.

The forecast on each existing system is routed at 168. The generic DS3 demand between any two central offices in the network is routed onto existing and proposed transport systems. The SPT routing is a near-optimal solution based on user-definable criteria for selection of systems and collections of systems on which to route the demand. AMC authors control the routing rules based on corporate business strategies and technology trends. The product of this step is a forecast demand for each network.

The required network technology and capacity are determined, as shown at block 170. Any demand that was not successfully routed onto existing or proposed transport systems at 168 is a candidate demand for new transport system planning. The SPT planning algorithm provides a near-optimal solution based on selectable criteria. AMC authors control the new system development rules based on corporate business strategies and technology trends. The product of this step is a set of proposed new SONET transport systems (rings and point-to-point systems) which will meet the transport demand between all central offices. This proposed network can be reviewed graphically and the present invention can be allowed to continue to select specific equipment and to develop the associated cost of the proposal, or the SPT can be reentered after changing demand, optimization criteria, or ring proposals until a satisfactory solution is reached.

The transport equipment planning and sizing occurs, as shown generally at 172. The output of the SPT provides a set of proposed SONET systems to meet anticipated demand that cannot be carried by existing network elements. It defines the architecture (point-to-point, chain, BLSR, or UPSR) and the overall system rate (e.g., OC-3, OC-12, OC-48, etc.) required to carry the anticipated demand. The SPT does not select the specific equipment and cost for the proposed systems, which are the purposes of this portion.

A looping process for planning transport equipment is begun. This process loops through each period to be planned, block 174, through each new network within each period, block 176, and through each fiber cable within each period, block 182. The planning continues until all transport equipment elements have been completed. An annual time period is shown, however any convenient time interval may be chosen for each loop.

The MUX equipment is selected, as shown at block 178. AMC authors define a set of rules per 162 that cover selection of new SONET multiplexer and associated equipment. These rules place equipment from the approved vendor list in accordance with corporate business strategies and technology trends. Specific equipment requirements are costed appropriate to the configurations required.

Fiber and wave division multiplexing (WDM) strategies are determined at 180. Each new system developed in the SPT requires fiber connectivity between the central offices spanned by the proposed SONET network. Using AMC-developed rules, a determination is made concerning whether place this system on existing spare fiber, employ WDM which allows multiple optical systems to use the same fiber, or install a new fiber cable. The demand is accumulated for individual interoffice fiber cable spans for each period.

Fiber cable requirements are determined at 184. This function can be executed to provide an estimate of total fiber costs for the proposed solutions considering interoffice demand alone, or the fiber and WDM requirements can be passed to the OSP module for integrated planning and cost estimation of fiber requirements throughout the area. AMC authors define rules to select appropriate fiber cable sizing based on overall fiber demand within a specified period.

The CO equipment planning and sizing occurs, as shown generally at 186. All common terminating equipment is planned for each year in the central office. Each type of equipment is planned independently. Further, each DCS is also planned independently.

A looping process for planning the CO equipment is begun. This process loops through each period to be planned, block 188, and through each equipment type within each period, block 190. The planning continues until all elements of CO equipment have been completed. An annual time period is shown, however any convenient time interval may be chosen for each loop.

The equipment requirements are determined, as shown at block 192. The forecast for each equipment type or DCS is determined in an existing tool. When the forecast exceeds the available for the termination type (DS3, DS1, or DS0, as appropriate to that equipment technology), a requirement to augment this equipment is generated.

Augment technology is selected at 194. AMC authors define rules that address growth, replacement, or augmentation of a particular equipment type within the CO. These rules are applied and a technology solution is reached to address the shortfall in available terminations. AMC authors define a set of rules to select specific equipment from the approved vendor list to meet the identified technology requirements. These rules define the period of the forecast and the required office spare capacity for each equipment type and the appropriate number of this specific equipment is costed. The added capacity is then available for use in the central office to handle forecast demands for subsequent years.

Output is generated, as shown at block 196. The primary output of the interoffice module contains an inventory of existing equipment and transport systems in the specified areas, a listing of proposed additional equipment and transport systems, and a listing of proposed fiber cable and WDM placements. This module can also produce itemized cost summaries, a job-oriented output for input to corporate job tracking systems, and the proposed fiber cable and WDM placements for integration with the OSP module. The itemized cost summary output can also be passed to the common system module to plan alarm, power, floor space, and other common systems technologies as discussed forthwith.

Figure 6:
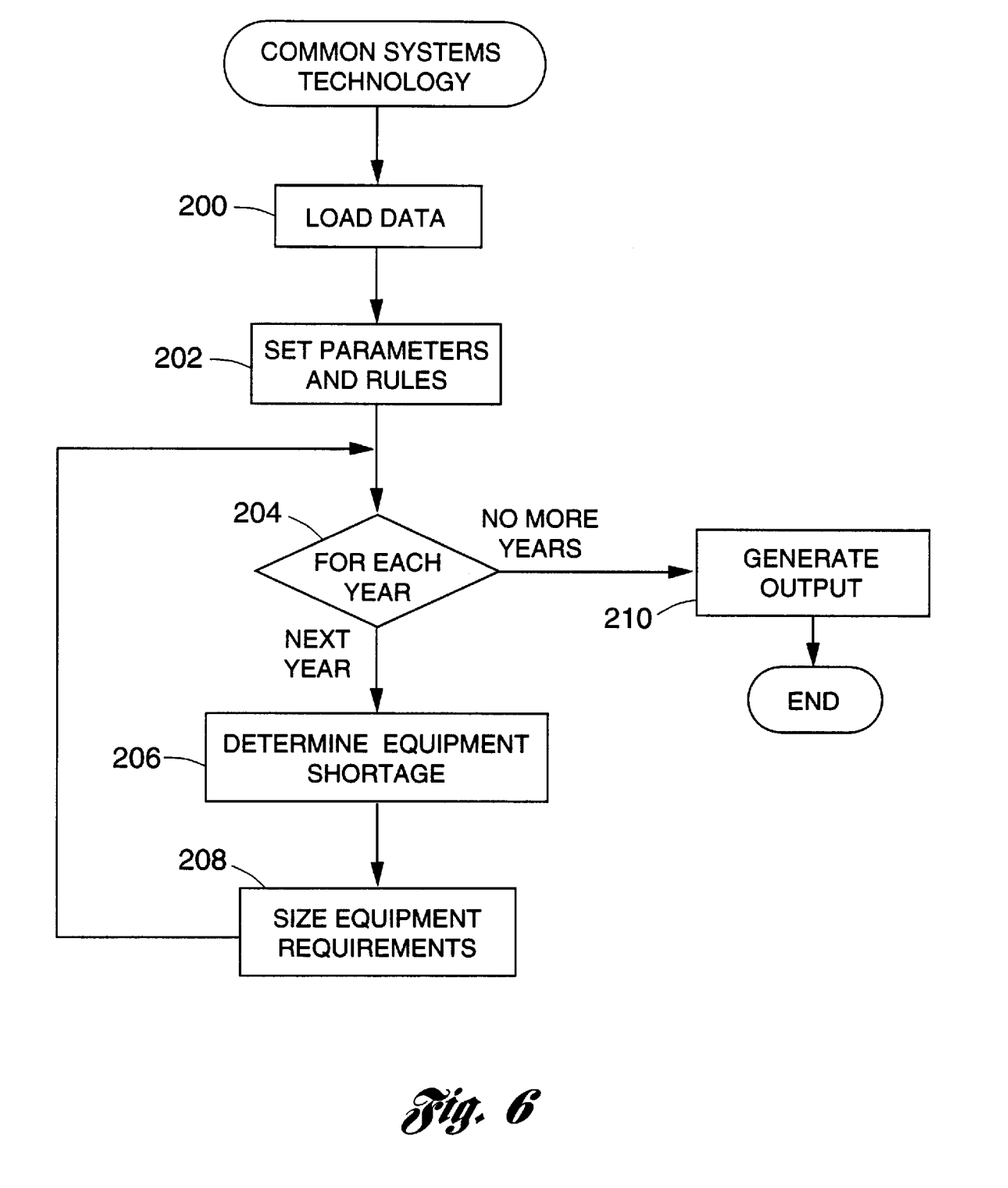
FIG. 6 is a flow diagram representing operation of a system or method for planning and engineering common system technology according to the present technology.

Referring now to FIG. 6, the flow diagram illustrating operation of a system and method for implementing common systems technology calculations is shown. Common systems are equipment in the central office that serve the needs of the combined technologies introduced into the system. Typical common systems can include power, alarming, synchronization and mediation devices. Power is required by all the central office equipment that serves the OSP, switch and IOF. Alarming is a part of the monitoring network that sends a signal when a piece of equipment fails or reaches a utilization level that exceeds a preset threshold. Mediation devices are switches that accept performance monitoring signals from network elements and send those signals through a packet switch network (protocol X.25) to a monitoring center. Synchronization equipment are timing clocks that synchronizes all equipment in the various central offices. Each common system device type is planned separately.

Data is loaded, as shown at block 200. Data includes available mediation ports, power capacity and timing ports. The demand for these pieces of equipment is derived from the other technologies such as, for example, when the OSP technology is executed, the solution sets that are derived will generate a common systems demand (e.g., mediation port for each digital loop carrier central office terminal).

Parameters and rules are set at 202. Different rules are required for each piece of equipment. The strategies for growth are also included. For example, a strategy for mediation devices may be that all mediation devices will be sized to handle two years of demand.

A looping process for common systems planning is begun. This process loops through each period to be planned, block 166. An annual time period is shown, however, any convenient time interval may be chosen for each loop.

Equipment shortage is determined at 206. Inventory and demand data, obtained from 200 and 202, is used to determine the shortage for the equipment type and demand type (e.g., mediation port shortage) under consideration. The rules then determine the type of equipment that will be placed to meet this demand shortage.

Equipment requirements are sized, as shown at block 208. The shortages from 206 are analyzed and, based on rule sets from 202, a solution is obtained. The solution is then sized appropriately based on strategies such as, for example, 18 month solutions for line units.

Output is generated at 210, including the bill of materials as required. There are also details on the amount of central office labor hours that are required to complete the proposed jobs. A capital cost requirement is calculated and provided.

Figure 7:
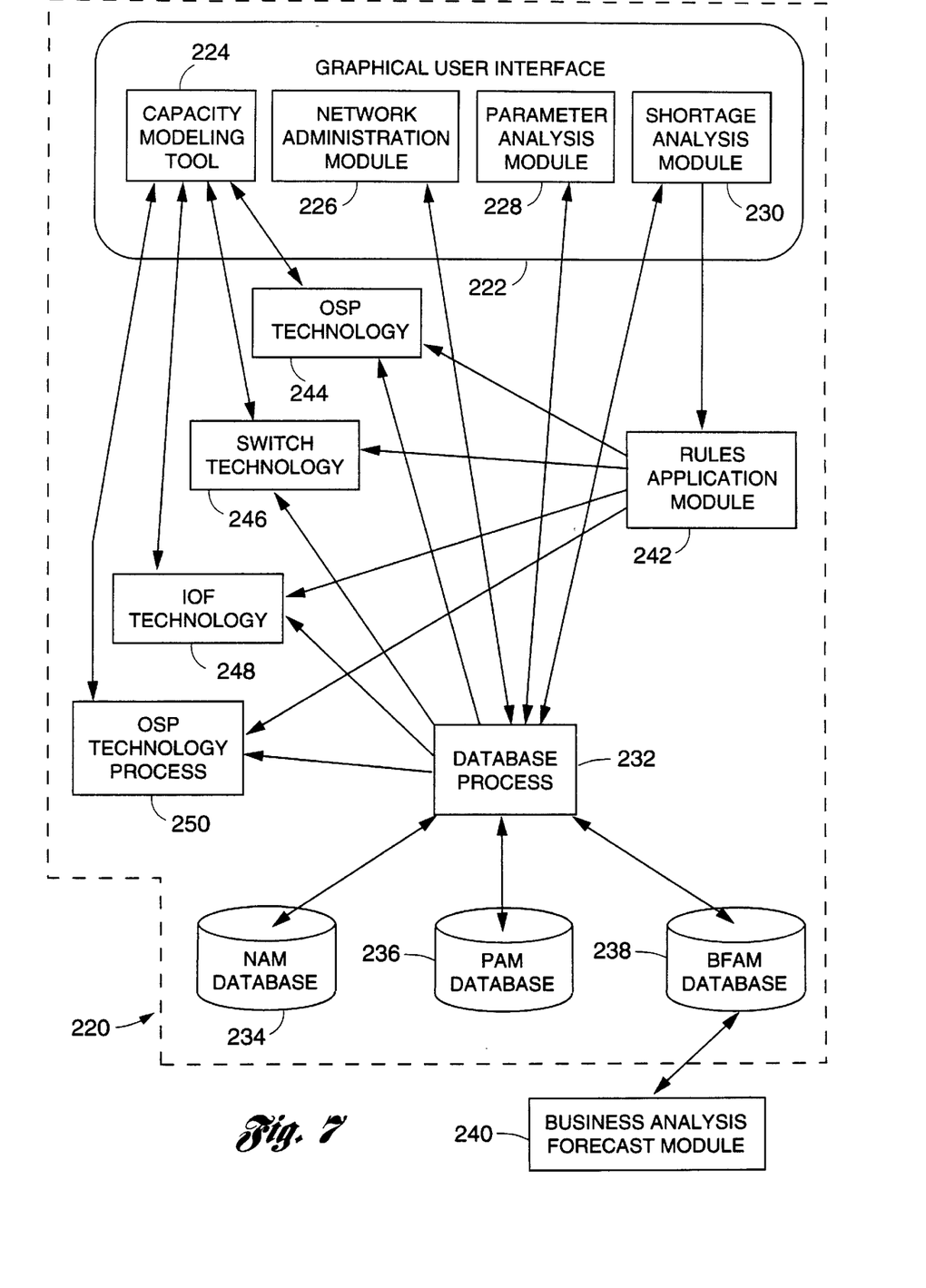
FIG. 7 is a block diagram of a system according to the present invention.

Referring now to FIG. 7, a system for planning and engineering a telecommunications network is shown. The telecommunications planning system is shown generally by 220. The system includes a graphical user interface (GUI) 222. The GUI is the means through which a user, not shown in the diagram, interfaces with the system. The GUI contains several custom modules for entering data, selecting options and displaying results. As is well known to one or ordinary skill in the art, the use of modules to partition functionality eases creation and modification and facilitates reuse.

One module in the GUI is the Capacity Modeling Tool (CMT) 224. CMT 224 is the interface to activate the planning process. Through CMT 224, the user selects the technology type. Possible types include OSP, switch, IOF, or common systems. The user can also select the area of coverage for the simulation. Possible regions include but are not limited to a wire center, a selected group of wire centers, LATA, statewide or corporate-wide. The user can also initiate simulation, display results, store results in files or a database, or print results.

A second module in the GUI is the Network Administration Module (NAM) 226. The NAM manages network modeling data, which includes but is not limited to wire centers, routing, carrier serving area, distribution area, section and remote terminal sites. Users may view, add and update network data through the NAM.

A third module in the GUI is the Parameter Entry Module (PAM) 228. The PAM allows a user to enter and modify simulation parameters. These include, for example, selecting and ranking strategies for adding OSP capacity such as replacing defective pairs or installing new analog or digital carriers.

A fourth module in the GUI is the Shortage Analysis Module (SAM) 230. The SAM accepts load forecasts and existing capacities to determine where shortages are likely to occur. Areas without shortages can be eliminated from consideration thereby reducing computation.

A processor containing database process 232 manages access to the system databases. In the current embodiment, this is implemented using SQL scripts as is well known to those with ordinary skill in the art.

The current embodiment of the present invention includes three databases. The NAM database 234 contains network information including but not limited to wire center, route, carrier service area, distribution, section, and remote terminal site information. The PAM database 236 contains parameter information. The Business Forecast Analysis Module (BFAM) database 238 contains demand forecasts. This data is developed the BFAM 240, a system not part of the present invention, and stored into the BFAM database.

A processor containing the Rules Application Process (RAM) 242 accepts input from the PAM 228 and SAM 230 as well as inventory data from the PAM database 236 to produce, among other items, a bill of materials describing the equipment required.

A processor containing technology processes performs the computations necessary to plan and engineer a telecommunications network. Each technology has its own process shown as OSP Technology 244, Switch Technology 246, IOF Technology 248, and Common Systems Technology 250. Each process uses data from databases 234, 236 and 238, rules from RAM 242, as well as input provided by CMT 224 to develop the output, which is forwarded to CMT 224. Description of the technology processes according to the present invention are described with references to FIGS. 2 through 6.

The system described in FIG. 7 may be implemented as hardware, software, or a combination of both. The implementation may be realized on one or more processors. Furthermore, elements described may be combined or further partitioned within the spirit and scope of this invention.

While the best mode for carrying out the invention has been described in detail, those familiar with the art to which this invention relates will recognize various alternative designs and embodiments for practicing the invention as defined by the following claims.

What is claimed is:

1. A method for planning a plurality of elements of a future telecommunications network from an existing telecommunications network interconnecting a plurality of users, the existing network having a plurality of elements including central offices, a plurality of loops connecting one of the plurality of users to one of the central offices, a plurality of transports each connecting one of the central offices to another of the central offices, a plurality of switches wherein each switch terminates one or more of the plurality of loops within one of the central offices, and common systems within each of the central offices, the method comprising:

defining a plurality of rules associated with the characteristics of the plurality of elements of the existing telecommunications network;

determining a plurality of demands for the future telecommunications network;

determining future characteristics of the plurality of loops based on the plurality of rules and the plurality of demands;

determining future characteristics of the plurality of transports based on the plurality of rules and the plurality of demands;

determining future characteristics of the switches based on the future characteristics of the plurality of loops and the future characteristics of the plurality of transports;

determining future characteristics of the common systems based on the future characteristics of the plurality of loops, the future characteristics of the plurality of transports, and the future characteristics of the plurality of switches; and determining the future telecommunications network based on the future characteristics of the plurality of loops, the plurality of transports, the switches and the common systems.

2. The method as recited in claim 1 wherein determining the plurality of demands further includes determining a plurality of business constraints associated with the future telecommunications network.

3. The method as recited in claim 1 wherein each of the plurality of users is allocated geographically into one of a plurality of distribution areas and each of the plurality of loops is allocated geographically into one of a plurality of routes that return to one of the central offices and wherein determining the future characteristics of the plurality of loops comprises:

determining requirements of each of the plurality of distribution areas for each route during each of a plurality of planning periods;

determining types and sizes of equipment necessary to satisfy the requirements of each of the plurality of distribution areas for each route during each of the plurality of planning periods;

determining the central office requirements necessary to satisfy the requirements of each of the plurality of distribution areas; and determining the total amount of equipment necessary to satisfy the requirements of all distribution areas over all of the planning periods.

4. The method as recited in claim 3 wherein each of the plurality of distribution areas is allocated geographically into one of a plurality of carrier service areas and wherein determining the requirements of each of the plurality of distribution areas comprises:

determining a first plan for each of the plurality of distribution centers beginning with the distribution center geographically farthest from the central office and continuing inward until ending with the distribution center closest to the central office;

determining a second plan for each of the plurality of carrier service areas, replacing the first plan for any distribution area within a carrier service area if the second plan found for the carrier service area containing the distribution center is more suitable than the existing distribution area first plan; and determining a third plan for each of the plurality of unique paths, replacing the first plan for any distribution area within a unique path if the third plan found for the unique path containing the distribution center is more suitable than the existing distribution area first plan.

5. The method as recited in claim 1 wherein each of the plurality of switches contain a plurality of peripherals, and wherein determining the future characteristics of the switches comprises:

determining a type of each of the switches;

determining shortages for each of the plurality of peripherals during each of a plurality of planning periods;

determining sizes required for each of the plurality of peripherals during each of the plurality of planning periods; and determining additional local requirements during each of the plurality of planning periods.

6. The method as recited in claim 1 wherein each end of the plurality of transports require terminations within one of the central offices and each of the central offices requires equipment to support terminations, and wherein determining the future characteristics of the plurality of transports comprises:

determining forecast capacity on each of the plurality of existing transports for each of a plurality of planning periods;

determining the technology and capacity of a plurality of new transports to handle any excess demand not covered in each of the plurality of existing transports for each of the plurality of planning periods;

determining future characteristics in each of the plurality of transport terminations; and determining future characteristics of equipment necessary to support terminations in each of the central offices containing transport terminations.

7. The method as recited in claim 5 wherein each of the plurality of transports comprises fibers bundled into a plurality of fiber cables and each of the plurality of transport terminations requires a plurality of multiplexers and wherein determining the future characteristics of the plurality of transports further comprises:

determining types and sizes for each of the plurality of transports for each of a plurality of planning periods;

determining one or more strategies for implementing each of the plurality of new transports for each of the plurality of planning periods; and determining fiber costs for a plurality of fiber cables for each of the plurality of planning periods.

8. The method as recited in claim 5 wherein determining the future characteristics of the equipment comprises:

determining requirements of equipment supporting transport terminations in each of the central offices for each of a plurality of planning periods; and selecting augment technologies when the determined equipment requirements exceed available capacities for each of the plurality of planning periods.

9. The method as recited in claim 1 wherein determining the future characteristics of the common systems comprises:

determining shortages in each of the existing common systems for each of a plurality of planning periods; and determining a size of new common systems required to satisfy shortages found in each of the existing common systems.

10. A system for planning a future telecommunications network from an existing telecommunications network interconnecting a plurality of users, the existing network having a plurality of elements including central offices, a plurality of loops connecting one of the plurality of users to one of the central offices, a plurality of transports each connecting one of the central offices to another of the central offices, a plurality of switches wherein each switch terminates one or more of the plurality of loops within one of the central offices, and common systems within each of the central offices, the system comprising:

a memory for storing a plurality of rules associated with the characteristics of the plurality of elements of the existing telecommunications network;

means for determining a plurality of demands for the future telecommunications network; and a processor operative to determine future characteristics of the plurality of loops based on the plurality of rules and the plurality of demands, determine future characteristics of the plurality of transports based on the plurality of rules and the plurality of demands, determine future characteristics of the switches based on the future characteristics of the plurality of loops and the future characteristics of the plurality of transports, determine future characteristics of the common systems based on the future characteristics of the plurality of loops, the future characteristics of the plurality of transports, and the future characteristics of the plurality of switches, and determine the future telecommunications network based on the future characteristics of the plurality of loops, the plurality of transports, the switches and the common systems.

11. The system as recited in claim 10 wherein the means for determining the plurality of demands is an input device.

12. The system as recited in claim 11 wherein the input device is a graphical user interface.

13. The system as recited in claim 10 wherein the means for determining the plurality of demands further includes means for determining a plurality of business constraints associated with the future telecommunications network.

14. The system as recited in claim 10 wherein each of the plurality of users is allocated geographically into one of a plurality of distribution areas and each of the plurality of loops is allocated geographically into one of a plurality of routes that return to one of the central offices and wherein the processor, in determining the future characteristics of the plurality of loops, is further operative to determine requirements of each of the plurality of distribution areas for each route during each of a plurality of planning periods, determine types and sizes of equipment necessary to satisfy the requirements of each of the plurality of distribution areas for each route during each of the plurality of planning periods, determine the central office requirements necessary to satisfy the requirements of each of the plurality of distribution areas, and determine the total amount of equipment necessary to satisfy the requirements of all distribution areas over all of the planning periods.

15. The system as recited in claim 14 wherein each of the plurality of distribution areas is allocated geographically into one of a plurality of carrier service areas and wherein the processor, in determining the requirements of each of the plurality of distribution areas, is further operative to determine a first plan for each of the plurality of distribution centers beginning with the distribution center geographically farthest from the central office and continuing inward until ending with the distribution center closest to the central office, determine a second plan for each of the plurality of carrier service areas, replacing the first plan for any distribution area within a carrier service area if the second plan found for the carrier service area containing the distribution center is more suitable than the existing distribution area first plan, and determine a third plan for each of the plurality of unique paths, replacing the first plan for any distribution area within a unique path if the third plan found for the unique path containing the distribution center is more suitable than the existing distribution area first plan.

16. The system as recited in claim 10 wherein each of the plurality of switches contain a plurality of peripherals and wherein the processor, in determining the future characteristics of the switches, is further operative to determine a type of each of the switches, determine shortages for each of the plurality of peripherals during each of a plurality of planning periods, determine sizes required for each of the plurality of peripherals during each of the plurality of planning periods, and determine additional local requirements during each of the plurality of planning periods.

17. The system as recited in claim 10 wherein each end of the plurality of transports require terminations within one of the central offices and each of the central offices requires equipment to support terminations and wherein the processor, in determining the future characteristics of the plurality of transports, is further operative to determine forecast capacity on each of the plurality of existing transports for each of a plurality of planning periods, determine the technology and capacity of a plurality of new transports to handle any excess demand not covered in each of the plurality of existing transports for each of the plurality of planning periods, determine future characteristics in each of the plurality of transport terminations, and determine future characteristics of equipment necessary to support terminations in each of the central offices containing transport terminations.

18. The system as recited in claim 16 wherein each of the plurality of transports comprises fibers bundled into a plurality of fiber cables and each of the plurality of transport terminations requires a plurality of multiplexers and wherein the processor, in determining the future characteristics of the plurality of transports, is further operative to determine types and sizes for each of the plurality of transports for each of a plurality of planning periods, determine one or more strategies for implementing each of the plurality of new transports for each of the plurality of planning periods, and determine fiber costs for a plurality of fiber cables for each of the plurality of planning periods.

19. The system as recited in claim 16 wherein the processor, in determining the future characteristics of the equipment, is further operative to determine requirements of equipment supporting transport terminations in each of the central offices for each of a plurality of planning periods, and select augment technologies when the determined equipment requirements exceed available capacities for each of the plurality of planning periods.

* * * * *